Figure 1:
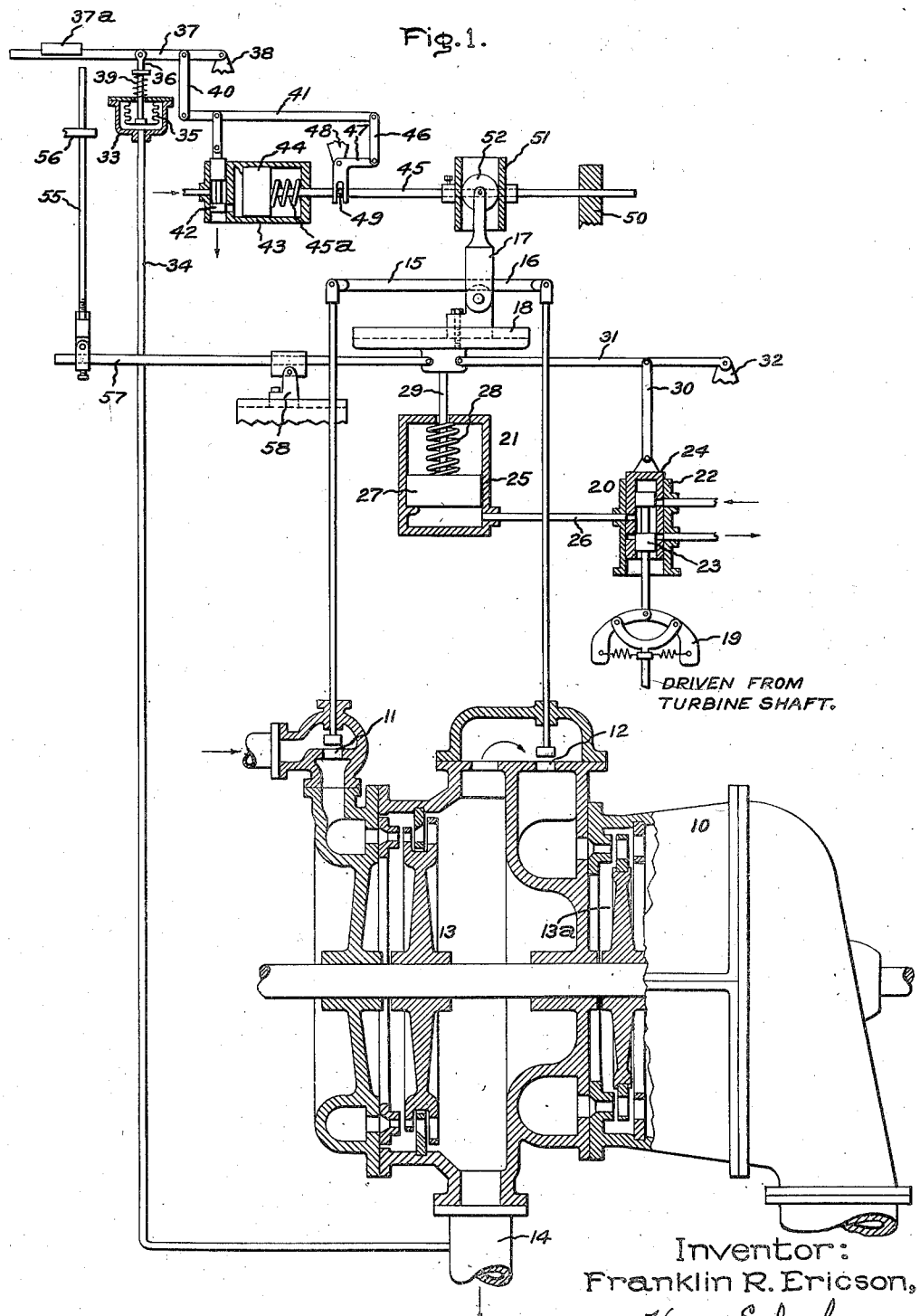

Oct. 12, 1937.  F. R. ERICSON  2,095,860

GOVERNING MECHANISM FOR ELASTIC FLUID TURBINES

Filed Dec. 5, 1935  2 Sheets—Sheet 1

Inventor:
Franklin R. Ericson,
by Harry E. Dunham
His Attorney.

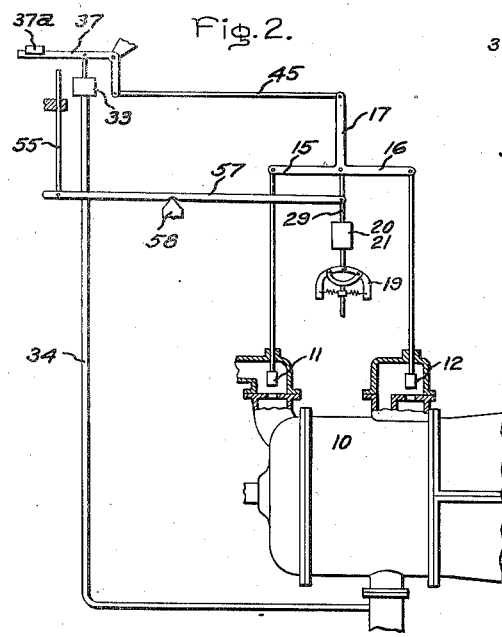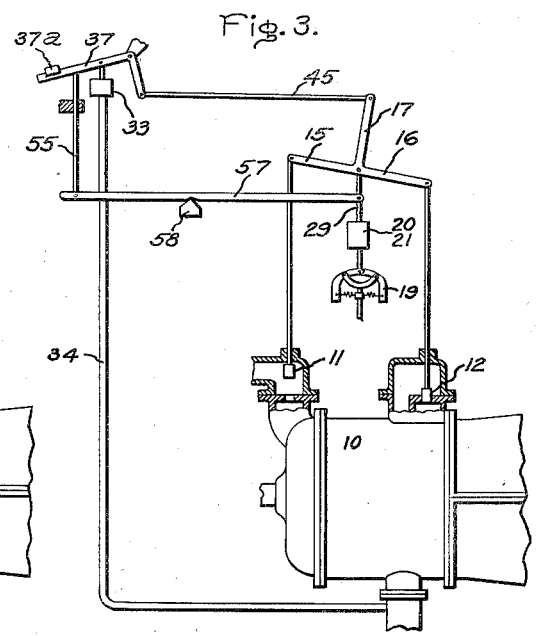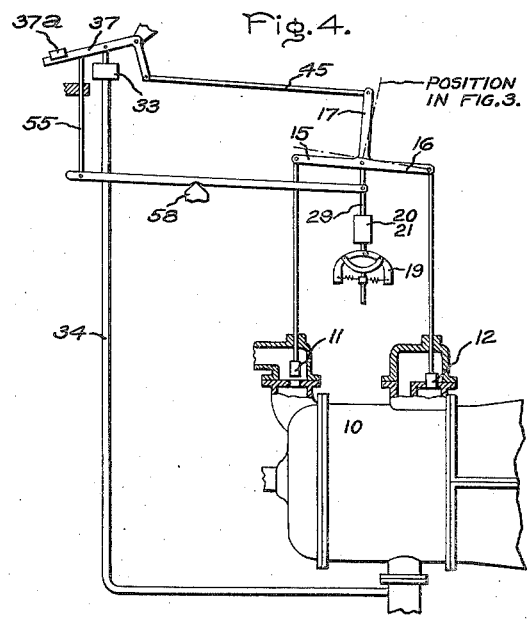

Patented Oct. 12, 1937

2,095,860

UNITED STATES PATENT OFFICE 2,095,860

GOVERNING MECHANISM FOR ELASTIC FLUID TURBINES

Franklin R. Ericson, Marblehead, Mass., assignor to General Electric Company, a corporation of New York Application December 5, 1935, Serial No. 53,011

5 Claims. (Cl. 60—67)

The present invention relates to governing mechanisms for elastic fluid turbines, more specifically to the type of governing mechanisms used for controlling turbines having an inlet valve and an interstage valve, the interstage valve serving to maintain substantially constant a condition of elastic fluid in a conduit connected to an intermediate stage of the turbine. Elastic fluid may be supplied through such conduit to an intermediate stage of the turbine in which case the turbine is operated as a mixed pressure turbine, or elastic fluid may be extracted through such conduit from the turbine and used for industrial purposes, for instance, in a processing system in which case the turbine is operated as an extraction turbine. In many cases it is desirable to control the inlet valve and the interstage valve of such turbines both in response to mechanical load changes on the turbine and in response to changes of a condition of the fluid in the conduit connected to the intermediate stage. More particularly, the invention relates to the kind of governing mechanisms which include a three-arm lever for accomplishing the above purposes. Such three-arm lever is connected to both valves and is moved in parallel up or down in order to open or close both valves in response to mechanical load changes. The three-arm lever is tilted or turned to open one valve and close the other in response to changes of a condition of the fluid flowing through the conduit connected to the intermediate stage.

One object of my invention is to provide an improved construction and arrangement of the type of governing mechanisms above specified whereby such mechanisms are considerably simplified, reduced in weight, permit flexibility of application, and can be manufactured at comparatively low cost. Another object of my invention is to provide a governing mechanism for improved control at light loads with all of the elastic fluid being extracted.

For a consideration of what I believe to be novel and my invention, attention is directed to the following description and the claims appended thereto in connection with the accompanying drawings.

Fig. 1 of the drawings represents a governing mechanism embodying my invention in connection with an elastic fluid turbine, and Figs. 2, 3, and 4 show simplified diagrammatic views of the mechanism of Fig. 1 in different operating positions.

The arrangement comprises an elastic fluid turbine 10 having an inlet valve 11 for controlling the flow of elastic fluid to the turbine and an interstage valve 12 for controlling the flow of fluid from an intermediate or higher stage 13 to a lower stage 13a. A conduit 14 is connected to the turbine casing to extract elastic fluid from the stage 13. A governing mechanism is provided for controlling the two valves 11 and 12 in response to changes in demand for mechanical load output and in response to changes in demand for extraction fluid. The governing mechanism includes a three-arm lever having arms 15, 16, and 17. The arms 15 and 16 are united to form a single, straight lever and the arm 17 is adjustably secured in inclined, upright position, in the present instance to the arms 15 and 16. The opposite or free ends of the arms 15 and 16 are connected to the valves 11 and 12 respectively so that parallel movement of arms 15, 16 causes simultaneous opening or closing of the valves 11, 12 and turning movement of the arms 15, 16 about their connection with the arm 17 causes closing movement of one valve and opening movement of the other. The three-arm lever in accordance with my invention is pivotally supported on a platform 18. The governing mechanism, as far as it serves to control the turbine in response to load changes, includes in addition to the aforementioned elements a speed governor 19 driven from the turbine shaft, a pilot valve 20 and a hydraulic motor 21. The pilot valve is of known design, and comprises a casing 22, pilot valve heads 23 disposed in the casing and connected to the speed governor, and a sleeve, or bushing 24. The hydraulic motor 21 includes a cylinder 25 having a lower portion connected to the pilot valve by a conduit 26. A piston 27 movably disposed in the cylinder 25 is biased in downward direction by a compression spring 28 and has a stem 29 fastened to the platform 18. The usual follow-up mechanism between the pilot valve and the hydraulic motor includes in addition to the aforementioned sleeve or bushing 24 a link 30 pivotally connected to the bushing and to a lever 31, which latter is pivotally connected at its left-hand end to the platform 18 and at its right-hand end to a fulcrum 32. During operation, an increase in speed due to a decrease in demand for mechanical load output causes the governor 19 to move the pilot valve heads 23 downward whereby oil or like actuating fluid is drained from the lower part of the cylinder 25 through the pilot valve 20, permitting downward movement of the piston 27 which in turn effects a similar downward movement of the platform, together with the three-arm lever 15, 16, and 17, resulting in closing movement of both valves 11 and 12. Downward movement of the piston 27 also causes downward turning movement of the lever 31 to effect downward movement of the bushing 24 until the ports of the pilot valve are covered or the bushing and pilot valve heads assume their original relative positions. During an increase in demand for mechanical load output, causing a decrease in speed, the elements are moved similarly but in opposite direction to effect opening of both valves 11 and 12.

An important feature of the mechanism so far described is that the hydraulic motor representing the actuating force for moving the valves is connected directly to the point where the actuating force is needed, in the present instance to the three-arm lever 15, 16, 17, the platform 18 being in substance an integral part of the hydraulic motor as regards the transmission of actuating forces from the motor to the three-arm lever.

The governing mechanism, as far as it serves for controlling the turbine in response to changes in flow or pressure or like condition of the elastic fluid in the conduit 14, includes in the present example in addition to the three-arm lever 15, 16, 17 a pressure responsive device having a casing 33 connected by a pipe 34 to the extraction conduit 14. A bellows 35 is disposed in the casing 33 and connected by a link 36 to a lever 37 which latter has a right-hand end pivotally secured to a fulcrum 38. The bellows 35 is biased in downward direction by a weight 37a on the lever 37 and a spring 39 surrounding the link 36. A point of the lever 37 intermediate its fulcrum 38 and the connection with the link 36 is connected by a link 40 to the left-hand end of a floating lever 41. An intermediate point of the lever is connected to a pilot valve head 42 for controlling the flow of actuating fluid to a horizontally disposed hydraulic motor having a cylinder 43 with a piston 44, a piston stem 45 and a compression spring 45a. The right-hand end of the lever 41 is connected to the stem 45 by means including a link 46 and a bell crank lever 47 supported on a fulcrum 48 and having one arm connected to the link 46 and another arm engaging a pin 49 on the stem 45. The right-hand end of the stem 45 projects slidably through a bearing 50. The stem 45 also is connected to the lever 17 of the three-arm lever by means including a guide 51 adjustably secured to the stem 45 and a roller 52 disposed within the guide and pivotally secured to the upper end of the arm 17.

The operation of the pressure responsive governing mechanism is as follows: An increase in pressure in the conduit 14, due to a decrease in demand for extraction elastic fluid, causes collapsing of the bellows 35 whereby the lever 37 is turned upward about the fulcrum 38. This causes, through the link 40 and the floating lever 41, upward movement of the pilot valve 42, which thereby uncovers its port connection with the hydraulic cylinder 43 and permits draining of actuating fluid from the latter. The piston 44 thereby is moved towards the left by the action of the compression spring 45a, resulting in counterclockwise turning movement of the three-arm lever 15, 16, 17, about its connection with the platform 18 to effect closing of the valve 11 and opening of the valve 12. This reduces the flow of elastic fluid to the inlet of the turbine and consequently through the extraction conduit 14. At the same time it increases the relative flow of elastic fluid from the higher stages to the lower stages and thereby maintains constant the mechanical load output of the turbine. Movement of the piston 44 towards the left also causes restoring of the pilot valve head 42. As will be readily seen, during such operation the bell crank lever is turned clockwise about its fulcrum 48 whereby the link 46 is moved downward and through the lever 41 effects downward movement of the pilot valve head 42 until the latter assumes its original position in which it covers the port connection to the cylinder 43.

If during operation the pressure in the extraction conduit decreases, due to an increased demand for load, the bellows 35 expands and causes downward movement of the levers 37 and 41 to cause the supply of actuating fluid to the hydraulic cylinder 43. The piston 44 thereby is moved towards the right, causing restoring of the pilot valve position and clockwise turning movement of the three-arm lever, resulting in opening movement of the inlet valve 11 and closing movement of the intermediate stage valve 12. Opening of the valve 11 effects an increased flow of elastic fluid through the first stage or stages of the turbine, thereby increasing the pressure in the extraction conduit 14, thus satisfying the demand for extraction fluid. The increased flow of elastic fluid through the first turbine stages increases the mechanical load output of these stages. This increase, however, is compensated by a corresponding decrease of the mechanical load output of the lower stages, due to closing movement of the intermediate stage valve 12.

Under the above conditions the normal demands for mechanical load output and extraction elastic fluid are satisfied during changes of either the load output or the demand for extraction fluid. However, if the demand for extraction fluid is great enough to carry a required load on the unit, the intermediate stage valve 12 will be closed and the high pressure valve 11 will be opened sufficiently to satisfy the demand for extraction fluid and mechanical load output. If under such condition the demand for extraction fluid remains constant and the demand for mechanical load output drops, the speed governing mechanism will, as described above, act to close both valves 11 and 12. Owing to the fact that the valve 12 is already closed, this valve will overtravel without in any way affecting the flow of elastic fluid through the turbine. The inlet valve 11 then will assume its correct position in which the requirements for mechanical load output are satisfied whereas the pressure in the extraction conduit drops. If now the demand for mechanical load output remains constant, whereas the demand for extraction fluid drops, causing an increase in pressure in the extraction conduit 14, the pressure governor will, as described above, effect turning of the three-arm lever in counterclockwise direction to close valve 11 and to open valve 12. However, due to the fact that the valve 12 has overtraveled, it will not affect the flow of steam through the turbine. This condition consequently upsets the load, causing slowing down of the unit, which in turn causes the speed governor to open both valves. This unstable condition will continue until the overtravel of the valve 12 is taken up or compensated and the valve actually starts to open again, at which point the two valves will operate and stabilize both load and extraction demands. In order to overcome this drawback I provide in accordance with my invention a mechanism which may be termed a modulating or modifying device for the control arrangement described above. This mechanism includes means forming an adjustable stop which is automatically moved after the extraction valve is just closed to prevent overtravel of the latter. The stop means has been shown in the present instance as including a vertical rod 55 projecting through a guide 56 and having an upper end disposed below the left-hand portion of the lever 37 and a lower end pivotally connected to the left-hand end of a lever 57. The latter has its right-hand end pivoted to the platform 18 and an intermediate portion slidably projecting through a fulcrum 58. The stop means is positioned by the speed or mechanical load-responsive mechanism. Thus, downward movement of the piston 27 of the hydraulic motor 21 causes upward movement of the rod 55. During low load condition, with the valve 12 just closed, the stop prevents movement of the low pressure valve when the high pressure valve is moved towards closing position. Such condition arises especially when the machine is operated at low load with the total amount of steam extracted.

Figs. 2, 3, and 4 show simplified diagrammatic views of the operating mechanism under low load conditions, that is, under conditions during which the intermediate stage valve 12 is closed, the elastic fluid passing through the first turbine part being sufficient to satisfy the mechanical load output. The reference characters applied to Figs. 2, 3, and 4 correspond with those of Fig. 1. More specifically, Fig. 2 shows the mechanism under an operating condition corresponding to that of Fig. 1 in which both valves 11 and 12 are open. Under this condition the upper end of the vertical rod 55 forming a stop for the lever 37 is out of the way, permitting free operation of both the speed-governing and the pressure-governing mechanism. As explained above, operation of the speed-governing mechanism causes parallel upward movement of the three-arm lever 15, 16, 17, and operation of the pressure-governing mechanism causes turning movement of the three-arm lever 15, 16, 17. If now the demand for extracted elastic fluid increases to a point where its work is equal to the demand for mechanical load output on the unit, the three-arm lever is turned into a position in which the valve 12 is just closed and the valve 11 opened. This position is shown in Fig. 3. In this position the upper end of the vertical rod 55 just contacts the lever 37, thus forming a stop with respect to downward movement of the lever 37 and preventing control by the pressure-governing mechanism in case the demand for extraction fluid should increase. If under this condition the demand for mechanical load output drops so that the amount of elastic fluid necessary to meet the mechanical load output is below the demand for extracted elastic fluid, the mechanism is moved into the position indicated in Fig. 4. Ordinarily, that is, without the provision of the modulating device including the lever 57 and the vertical rod 55, a decrease in the demand for mechanical load output would cause closing movement of both valves 11 and 12 and as valve 12 is already closed would result in overtravel of the valve 12 in closing direction. This is prevented by the modulating means. The valve 12 remains in its position, whereas the valve 11 is moved towards closing direction to satisfy the decreased demand for mechanical load output. Under these conditions, as explained above, it is no longer possible to satisfy the demand for extraction fluid. In the present instance the pressure of the extraction fluid in the conduit 14 drops. The action of the modulating device under such conditions is as follows: A decrease in demand for mechanical load output causes an increase in speed. This increase in speed effects downward movement of the stem 29 and clockwise turning movement of the lever 57 which has one end pivotally connected to the stem 29. This turning movement of the lever 57 causes upward movement of the rod 55, resulting in turning movement of the lever 37 and movement of the rod 45 towards the left, whereby the three-arm lever 15, 16, 17 is turned in counter-clockwise direction. With this turning movement of the three-arm lever the right-hand end of the arm 16 remains in position. Hence, no overtravel of the intermediate stage valve 12 takes place. The original position of the three-arm lever, which is that of Fig. 3, is indicated in dotted lines in Fig. 4. Thus it will be seen that when thereafter the elastic fluid demand in conduit 14 drops and raises the pressure sufficiently to operate the pressure governor both valves 11 and 12 come into action immediately, thereby eliminating the unstable condition.

With my invention I have accomplished an improved governing mechanism for extraction and mixed pressure turbines. My mechanism, as explained above, includes the usual three-arm lever which has a first and a second arm in alinement and connected to the valves to be controlled, and a third arm inclined to the other arms, usually by ninety degrees. The speed or mechanical load-responsive mechanism includes a motor which in accordance with my invention is connected to and acts directly on the first and second arm of the three-arm lever. The mechanism responsive to a condition of the fluid in the extraction stage or the conduit connected thereto includes a hydraulic motor connected to and acting directly on the third arm of the three-arm lever. Such motor is preferably disposed horizontally so that the piston stem is at right angles to the third arm and also to the piston stem of the hydraulic motor of the load-responsive mechanism. This simplified design of the mechanism permits in certain instances a reduction in weight of the mechanism up to 80% of similar mechanisms heretofore used.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. An elastic fluid turbine having an intermediate stage with an extraction conduit, an inlet valve for controlling the supply of elastic fluid to the turbine and an intermediate stage valve for controlling the flow of elastic fluid from the intermediate stage to the succeeding stages, a three-arm lever connected to the valves, a speed-governing mechanism and a mechanism responsive to one of the conditions of pressure and temperature of the elastic fluid in the extraction conduit connected to the three-arm lever, and means for modifying the speed actuation of the valves by the speed-governing mechanism during low load conditions to prevent overtravel in closing direction of the intermediate stage valve, said means including a stop in cooperative relation with the extraction mechanism and moved in response to movement of the speed-governing mechanism.

2. An intermediate stage extraction elastic fluid turbine having an inlet valve and an intermediate stage valve, a governing mechanism for controlling said valves in response to mechanical load changes and in response to changes in demand for extraction elastic fluid, and means for modifying the action of the governing mechanism during low load condition with the intermediate stage valve closed in order to prevent overtravel of the intermediate stage valve in closing direction in response to further drop in demand for mechanical load output, said means including a lever mechanism connected to and moved in response to movement of the load-responsive mechanism.

3. An elastic fluid multi-stage turbine having an inlet valve for controlling the flow of elastic fluid to the turbine, a conduit connected to an intermediate stage for extracting fluid therefrom and for conducting fluid thereto, a valve for controlling the flow of elastic fluid from the intermediate stage to the succeeding lower stage, and a governing mechanism for controlling both valves normally to maintain constant the fluid pressure in the conduit during varying demand of load output and to maintain constant the load output during variations in flow through the conduit, said mechanism including a speed-responsive device for positioning the valves in response to changes in demand for load output, means including a pressure-responsive device connected to the conduit for positioning the valves in response to pressure changes in the conduit and means connected to the speed-responsive means and cooperatively associated with the pressure-responsive means to prevent overtravel of the intermediate stage valve during low load conditions.

4. An elastic fluid turbine having an inlet valve, an extraction conduit connected to an intermediate stage, a valve controlling the flow from the intermediate stage to the succeeding stage, and a governing mechanism for controlling both valves, said mechanism comprising a three-arm lever having two horizontal arms connected to the valves and a vertical arm, a load-responsive mechanism connected to said two arms to effect movement of the valves in response to load changes, a pressure-responsive mechanism connected to the vertical arm to turn the three-arm lever in response to pressure changes in the conduit, and means to prevent overtravel of the intermediate stage valve in closing direction during low load conditions of the turbine, said means including a stop associated with the pressure-responsive mechanism and mechanically connected to the speed-responsive mechanism.

5. An elastic fluid turbine of the extraction and mixed pressure type having an inlet valve, a conduit connected to an intermediate stage, an intermediate stage valve, and a governing mechanism for controlling the valves, said mechanism comprising a three-arm lever, a load-responsive mechanism including a motor acting directly on the three-arm lever and a pressure-responsive mechanism including a motor disposed at right angles to the aforementioned motor and having a piston with a stem, and means connecting the stem to an arm of the three-arm lever, said means comprising a guide adjustably secured to the stem and a roller engaging the guide and secured to said arm.

FRANKLIN R. ERICSON.